Nov. 12, 1929.   L. L. GILLESPIE   1,735,042
EGG CRATE FILLING APPARATUS
Filed July 27, 1928   2 Sheets-Sheet 1
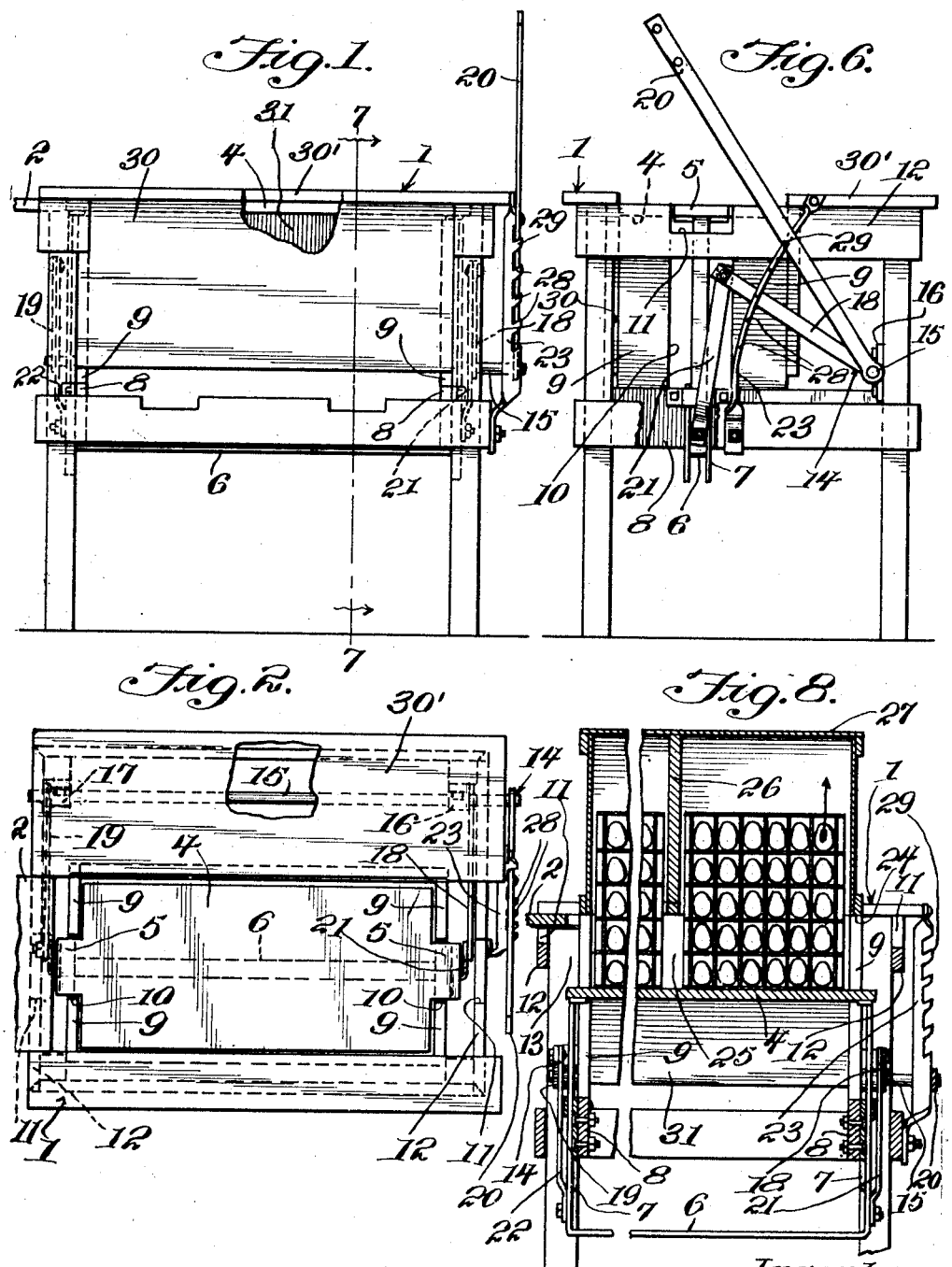
Inventor
Loren L. Gillespie
By Spear, Middleton, Donaldson & Hall
Attorneys Nov. 12, 1929.  L. L. GILLESPIE  1,735,042
EGG CRATE FILLING APPARATUS
Filed July 27, 1928  2 Sheets-Sheet 2
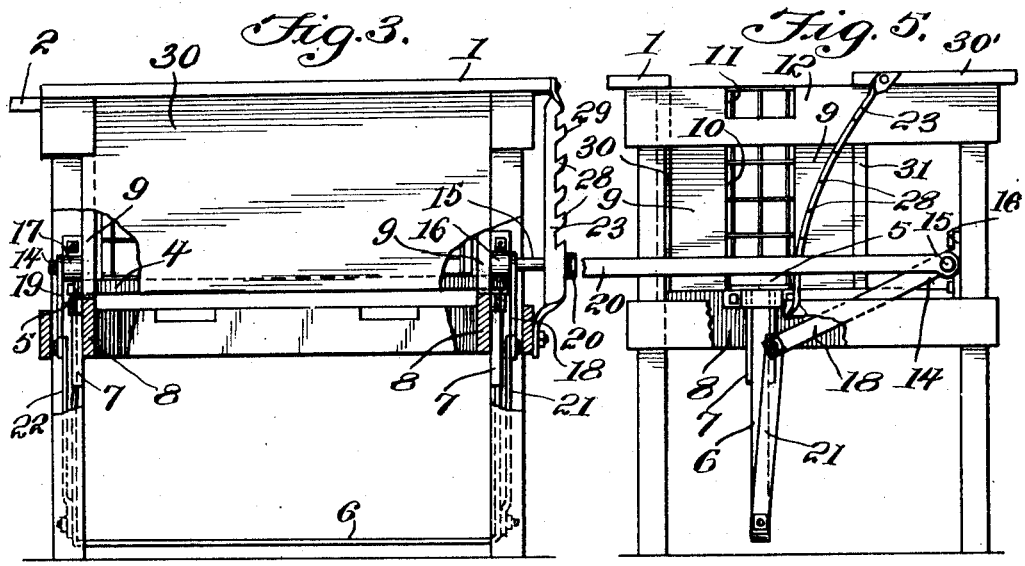
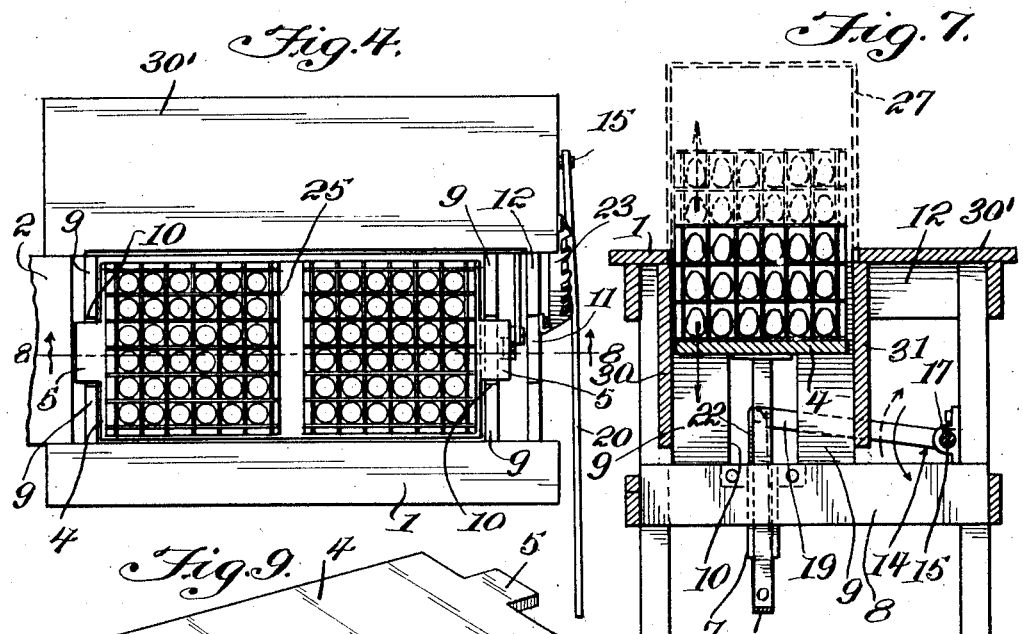
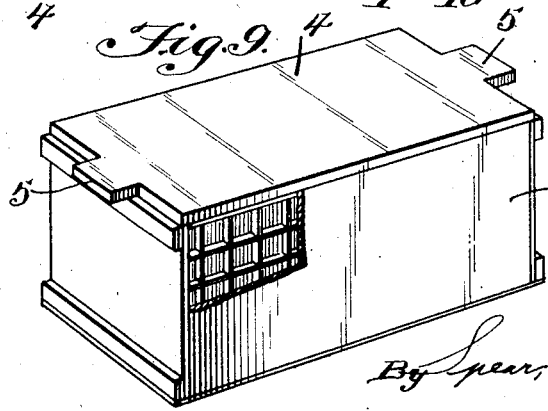
Inventor
Loren L. Gillespie
By Spear, Middleton, Donaldson & Hall
Attorneys Patented Nov. 12, 1929

1,735,042

UNITED STATES PATENT OFFICE

LOREN L. GILLESPIE, OF HOPKINS, MISSOURI

EGG-CRATE-FILLING APPARATUS

Application filed July 27, 1928. Serial No. 295,765.

This invention relates to improvements in apparatus for filling egg crates or like receptacles.

More particularly, my invention relates to the filling of receptacles, such as egg crates with the eggs or other individual commodities arranged in layers, so many in a layer and individually separated by fillers and the layers or fillers separated by flats.
An object of the invention is the provision of means for arranging layers of eggs in position to be received in the crate altogether as a body, and to completely fill the crate in an expeditious manner without danger of breakage of the eggs.

Another object is to provide means movable step by step or otherwise as desired, through a total distance, approximately equal to the depth of a standard egg crate.
A further object is to provide vertically movable egg filler receiving means adapted to be adjusted downwardly step by step to receive the fillers one by one until enough have been received to completely fill a standard egg crate, and adapted to be then moved upwardly into an inverted standard egg crate whereby the crate is filled and may be turned upright while so filled, thus providing efficient and simple means for effectively packing eggs for shipping.

The invention consists in the features, combination, and arrangement of parts hereinafter described and particularly pointed out in the claims.
In the drawings:

Fig. 1 is a front view of my egg crate filling device with the platform raised to uppermost position.

Fig. 2 is a top plan view of Fig. 1.
Fig. 3 is a front view of the device with the platform in lowermost position.

Fig. 4 is a top plan view of Fig. 3.

Fig. 5 is a right side elevation of Fig. 3.

Fig. 6 is a right side elevation of Fig. 1.
Fig. 7 is a transverse sectional view substantially on line 7—7 of Fig. 1, but with the platform at an intermediate elevation and partially loaded.

Fig. 8 is a longitudinal section substantially on line 8—8 of Fig. 4, but with the egg crate inverted in place on its supports and the loaded platform at an intermediate elevation and forcing the load of eggs, fillers, and flats into the crate.

Fig. 9 is a view of the loaded crate, turned upright with the removable platform covering its open top.

Referring to the drawings, 1 is a table or frame constituting the supporting framework or structure of my filling apparatus.

At 2 is shown the receiving end of the table 1 where fillers of eggs with their flats are adapted to be received, and slid across the removable platform 3, or across fillers already positioned on the platform, into proper position on the platform or fillers, to form a pair of stacks of fillers of eggs separated by flats and adapted for insertion into the compartments of an egg crate.

This device is especially adapted to be used in connection with an egg candling machine, such as that forming the subject matter of my copending application, Serial No. 243,402 filed Dec. 29, 1927, and to receive the fillers of candled eggs as they are discharged from the candler and to refill the crates with the fillers of eggs.

Within the scope of the invention, however, it is apparent that the fillers of eggs need not be received at any particular end of the refiller, but that they may be manually placed in proper position on the removable platform without sliding movement.

Also, it will be understood that the invention is not limited to two stacks of fillers, but that only one stack may be used, and other types of fillers for other commodities may be used within the scope of the invention.

The removable platform 4 rests with its ends 5 upon a vertically movable U-shaped frame 6, slidably carried in guides 7, mounted on cross bars 8 of table 1.

By means of the vertically movable frame 6, the platform 4 removably supported thereon, may be disposed flush with the surface of receiver 2 or lowered below the same.

Spaced apart, vertical guide members, 9, are mounted at the opposite ends of the table 1, a pair at each end and spaced apart to provide a slot, 10, for the reception and passage of the frame 6 and the ends 5 of the platform 4, which is carried by the frame 6.

Openings 11, for permitting manual access to the ends 5, of the platform 4, when it is desired to lift the same by its ends, are provided in the end cross members 12, of the frame or table 1.

If the receiver 2 is employed, the hand opening 11, at that end of apparatus cannot be used by the operator, but he can get a hold on the handle end 5 at that end through space 13 between the cross member 12 and the guide members 9. When the receiver 2 is not mounted on the cross member 12, the hand opening 11 at that end is open. The other hand opening 11 is always open to facilitate access to the handle end 5 of the platform.

The elevating and lowering means for the U-shaped frame 6, comprises a substantially U-shaped elevating frame, or double armed lever, 14, pivotally mounted at the back of the table frame 1 and adapted to swing with the base 15 of its U held pivotally against the frame 1 by bearing means as shown at 16 and 17. The base 14 of the frame is a rod to which are rigidly secured paralleled coextensive, spaced apart, lifting bars or arms, 18 and 19, which extend in a general forward direction with respect to the table.

At the right end of the rod 14, is shown an operating hand lever 20 rigidly secured to rod 14 and adapted to be manually moved to swing the lifting bars 18 and 19 up or down.

At the ends of the bars 18 and 19 are pivotally secured links 21 and 22 which connect pivotally to the side of frame 6 near its base.

It will be apparent that when the operating lever 20 is manipulated, the frame 6 is correspondingly moved vertically to raise or lower the same.

An arcuate ratchet 23 is provided on the table, and is adapted to cooperate with the operating lever 20 to provide a step by step movement, to be used in receiving and lowering the fillers of eggs step by step as they are placed or slided into position to be supported by the platform 4.

The vertical guide members 9 have their tops 24 flush with the receiving surface 2 so that the fillers of eggs may be slid thereover. When the frame 6 with platform 4 is raised to uppermost position the surface of the platform 4 is flush with the receiver 2 and with the tops 24 of the guides 9. Each step downwardly of the operating lever 20 will lower the platform the height of one filler of eggs so that as the downward step by step movement proceeds, and the placing of fillers over the platform at each step proceeds, there is always a filler of eggs, or in the embodiment shown, a pair of fillers of eggs, with their tops flush with the receiver 2 and the tops 24 and providing a surface for the reception of flats and a succeeding pair of fillers of eggs. The vertical guide members 9 form end retaining walls for the fillers while front and back partitions or walls 30 and 31 are provided as retainers, thus providing a filling receptacle or form having a movable bottom 4.

In the operation of the egg crate filling apparatus, the platform is loaded by the step by step movement above described, the fillers of eggs being successively received from a candler such as described in my copending application, and slid over the receiver 2 to proper position over the platform 4. The loading is continued until the platform 4 and frame 6 have been lowered by lever 20 to their lowermost position, the load, comprising two stacks of fillers of eggs and flats, the stacks being separated sufficiently as shown at 25 to permit the passage therebetween of the partition 26 of the egg crate 27. The height of the full load of fillers is sufficient to completely fill the egg crate 27, and the top of the load is flush with the tops 24 of the guides 9, which are adapted to serve as supports for the ends of the crate 27.

The crate is next placed over the load of fillers of eggs in inverted position with its ends resting upon the tops 24 of guides 9.

The lever 20 is then disengaged from its slight spring contact with the ratchet and is pressed outwardly so as to clear the teeth 28 and is then raised fully from lowermost to uppermost position and the lever caught and held by upper ratchet tooth 29. By this movement the load on the platform enters and fills the crate completely and closes its open top. The filled inverted crate with its top closed by the platform 4 is then restored with its top right side up by the operator who grasps the handle ends 5 of the platform, lifts the platform and filled crate, and then turns it over right side up. The platform 4 is then removed and replaced on the refiller for further use in filling the next crate, and the filled crate may be then closed for shipping in the usual manner.

The table 1 has a table surface 30′ toward the rear thereof, which is adapted to receive the egg crate, while the filling form is being filled.

Having thus described my invention, what I claim is:

1. In apparatus for filling egg crates or the like, a filling form having a vertically movable bottom adapted to receive fillers of eggs in a step by step lowering movement, so as to stack them in the filling form, means providing said step by step lowering movement, said means also providing for full upward movement of said vertically movable bottom through a distance substantially equal to the depth of a standard egg crate, said means comprising a vertically movable frame for supporting and moving said bottom, said filling form having vertical slots in its ends for the passage of the frame, a support for said filling form having guides for the vertically movable frame, a double armed or U-shaped lever pivoted to the support, links connecting the ends of the lever arms with the lower ends of the said frame, an operating hand lever rigidly secured to the U-shaped lever for swinging the same about its pivot to cause the lever arms to act on the links which act on the frame to raise and lower the frame and the movable bottom of the filling form, and a ratchet member on the support adapted to cooperate with the said hand lever in the step by step downward movement and to hold the frame in adjusted position.

2. In apparatus for filling egg crates or the like, a table support, a filling form mounted in said table support, said filling form comprising front and back walls and vertically slotted end walls, said form having capacity to receive the contents of a standard egg crate, a vertically movable bottom for said filling form, said bottom having handle projections at its ends, said projections extending the slots and beyond said end walls to be guided in said slots and to provide handles for said movable bottom, a vertically disposed and vertically movable inverted U-shaped lifting frame for removably supporting said bottom, guides in said table support for said lifting frame, said frame and bottom passing through the said slots in their vertical movement, and means for imparting vertical movement to said frame.

3. Apparatus according to claim 2 in which said means for moving the lifting frame vertically comprises a member pivoted to the table support, said member having lifting arms and an actuating hand lever, all rigidly secured thereto, links connecting the ends of said lifting arms with the lower ends of said lifting frame, an arcuate ratchet member mounted on the table support, said hand lever being in spring engagement with the teeth of said ratchet member to provide for step by step downward movement of the lifting frame, for full upward movement thereof and for retaining it in vertically adjusted position.

4. Apparatus according to claim 2 in which the upper ends of said end walls provide supports for the ends of an inverted standard egg crate, an egg filler receiver mounted at one end of the table support and adapted to slidably receive fillers of eggs from a candler, the upper ends of said end walls being disposed at the same level as the receiver, said filling form bottom when moved to uppermost position being at the level of the upper ends of its end walls whereby the fillers of eggs may be slid across the receiver and adjacent end wall into position over the said bottom, means providing access to the handles of the bottom, and said frame moving means including means for imparting step by step downward movement for successive receptions of said fillers of eggs and for imparting upward movement to transfer the contents of the filling form to the egg crate.

5. In apparatus for filling egg crates or the like, a filling form having an open top and having capacity to receive the contents of a standard egg crate, a vertically movable bottom in said filling form, means for raising and lowering said bottom relative to said filling form, said filling form being adapted to support an inverted egg crate over its open top, whereby upon upward movement of the bottom supporting the contents of the filled filling form, the contents are transferred to the crate, and means providing hand holds on the movable bottom for lifting it and the filled crate from the filling form and inverting the crate and bottom so that the crate is disposed right side up, said means providing handholds comprising handle projections on the ends of said movable bottom, said filling form having slots in its ends for the passage and guidance of said projections, said projections being extended so as to project beyond ends of the filling form and beyond the ends of the egg crate.

In testimony whereof I affix my signature.

LOREN L. GILLESPIE.